A. HERMAN.
STUD OR BUTTON.
APPLICATION FILED OCT. 14, 1908.
919,864.
Patented Apr. 27, 1909.
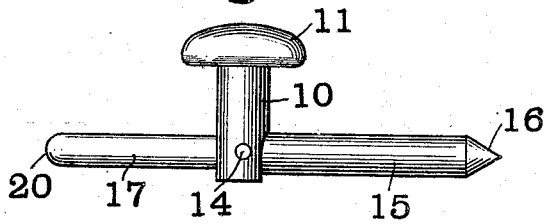
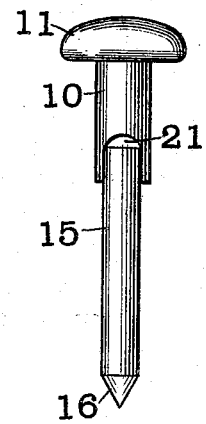
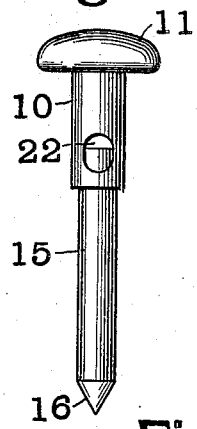
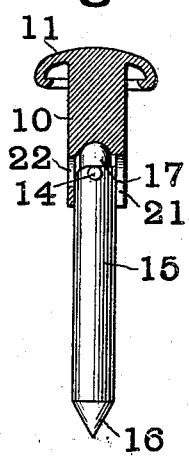
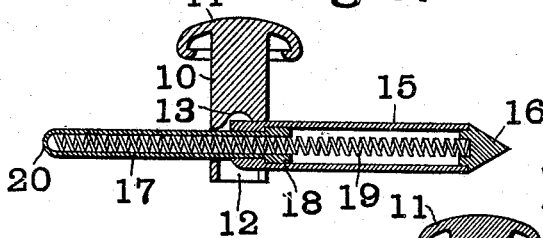
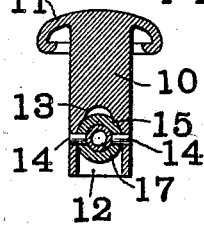
Witnesses
L. L. Mead.
W. H. Alexander.
Inventor
Adolph Herman
By his Attorneys
Fowler & Bryson

UNITED STATES PATENT OFFICE.

ADOLPH HERMAN, OF ST. LOUIS, MISSOURI, ASSIGNOR TO EISENSTADT MANUFACTURING COMPANY, OF ST. LOUIS, MISSOURI, A CORPORATION OF MISSOURI.

STUD OR BUTTON.

No. 919,864.      Specification of Letters Patent.      Patented April 27, 1909.

Application filed October 14, 1908. Serial No. 457,603.

*To all whom it may concern:*

Be it known that I, ADOLPH HERMAN, a citizen of the United States, residing at St. Louis, in the State of Missouri, have invented a certain new and useful Stud or Button, of which the following is such a full, clear, and exact description as will enable any one skilled in the art to which it appertains to make and use the same, reference being had to the accompanying drawings, forming part of this specification.

My invention relates to a shirt stud or collar button, and has for its object the production of an article of this class which may be readily inserted in the button-hole or eyelet of the shirt or other garment to which it is to be applied and which will be firmly retained in the garment and may, by proper manipulation, be readily removed therefrom.

In the accompanying drawings, in which one form of my invention is shown by enlarged views, Figure 1 is a side elevation, the parts being in position to retain the device in the garment. Fig. 2 is a side elevation, the parts being in position to allow the insertion of the device into the button-hole or eyelet. Fig. 3 is a view similar to Fig. 2 but looking at the opposite side. Fig. 4 is a view similar to Fig. 2 but looking at right angles thereto and having the upper part in section. Fig. 5 is a view similar to Fig. 1 but having the parts shown in section. Fig. 6 is a section at right angles to Fig. 5.

Like marks of reference refer to similar parts in the several views of the drawings.

10 is the shank of the device. This shank 10 carries at its forward end a head 11 and is provided at its rear end with a bore 12 forming a tubular portion at the rear end and terminating in a seat 13, the object of which will be hereinafter described. The head 11 may be made in the form of a button, as shown in the drawings, or it may consist of a setting for a jewel, or be of any other suitable form.

Pivoted in the tubular portion of the shank formed by the bore 12, by means of pivots 14, is a tubular stem 15. This tubular stem 15 is closed at its outer end by means of a plug 16 preferably pointed in order to facilitate the insertion of the device into the button-hole or eyelet. The inner end of the stem 15 is slightly contracted so as to fit a tubular extension member 17. This tubular extension member 17 is provided at its inner end with a collar 18 to limit its movement in the stem 15, as is shown in Fig. 5.

19 is a helical spring extending through both the stem 15 and the extension member 17 and bearing against the outer ends of those parts. The end of the extension member 17 is rounded, as shown at 20 (Fig. 5) so as to fit into the rounded seat 13 hereinbefore referred to and thus hold the stem 15 in alinement with the shank 10, as shown in Figs. 2, 3 and 4. One side of the tubular end of the shank 10 is provided with a U-shaped recess 21 so that the stem 15 may be swung on its pivots 14 into a position at right angles to the shank 10, as shown in Figs. 1 and 5. The opposite side of the stem 10 is provided with an aperture 22 through which the spring 19 causes the extension member 17 to protrude when the stem 15 is turned at right angles to the shank.

When the stem is brought into alinement with the shank, as shown in Figs. 2, 3 and 4, it will be evident that the device may be readily inserted in the button-hole or eyelet of the garment to which it has to be applied. After it is in position, the stem 15 is bent at right angles to the shank 10, as shown in Figs. 1 and 5. Owing to the rounded form of the seat 13 and the end 20 of the extension member 17, the stem can be bent without any undue pressure. These parts, however, hold the stem and shank in alinement with sufficient rigidity to allow the ready insertion of the device. When it is desired to remove the device from the garment, it is simply necessary to place the finger and thumb on the end 16 of the stem 15 and on the end 20 of the extension member 17 and thus force the extension member into the stem until the stem can be again drawn into alinement with the shank 10.

Having fully described my invention, what I claim as new and desire to secure by Letters Patent of the United States is:

1. In a stud or button, the combination with a head, of a shank carried thereby and tubular at its rear end, a stem pivoted in said shank, an extension member carried by said stem, said shank being provided at one side with a U-shaped recess to allow said stem to be turned at right angles to said shank and at the side with an aperture for said extension member, and a spring for operating said extension member through said aperture.

2. In a stud or button, the combination with a head, of a shank carried thereby and provided at its rear end with a tubular part terminating in a seat, a stem pivoted in said shank, an extension member carried by said stem, said shank being provided at one side with a U-shaped recess to allow said stem to be turned at right angles to said shank and at the other side with an aperture for said extension member, and a spring for holding said extension member into engagement with said seat to lock the shank and stem in alinement and for operating said extension member through said aperture.

3. In a stud or button, the combination with a head, of a shank carried thereby and provided at its rear end with a tubular member terminating in a seat, a tubular stem pivoted in said shank, a tubular extension member telescoping with said stem, said shank being provided at one side with a U-shaped recess to allow said stem to be turned at right angles to the shank and at the other with an aperture for said extension member, and a spring extending through said stem and extension member for holding said extension member in engagement with the seat to lock the shank and stem in alinement and for operating said extension member through said aperture.

In testimony whereof I have hereunto set my hand and affixed my seal in the presence of the two subscribing witnesses.

ADOLPH HERMAN. [L. S.]

Witnesses:
 W. A. ALEXANDER,
 ELIZABETH BAILEY.